United States Patent [19]

Besecke et al.

[11] Patent Number: 5,350,808
[45] Date of Patent: Sep. 27, 1994

[54] POLY(METH)ACRYLIMIDES WITH DIFFERENT N-SUBSTITUTES

[75] Inventors: Siegmund Besecke, Hameln; Andreas Deckers, Ludwigshafen; Harald Lauke, Mannheim, all of Fed. Rep. of Germany

[73] Assignee: BASF Aktiengesellschaft, Ludwigshafen, Fed. Rep. of Germany

[21] Appl. No.: 994,251

[22] Filed: Dec. 21, 1992

[30] Foreign Application Priority Data

Dec. 21, 1991 [DE] Fed. Rep. of Germany ....... 4142573

[51] Int. Cl.$^5$ .............................................. C08F 8/32
[52] U.S. Cl. .................... 525/330.5; 525/378; 525/379
[58] Field of Search ............. 525/330.5, 378, 379

[56] References Cited

U.S. PATENT DOCUMENTS

| | | | |
|---|---|---|---|
| 2,146,209 | 2/1939 | Graves et al. | 260/2 |
| 3,284,425 | 11/1966 | Schroeder et al. | 260/89.5 |
| 4,169,924 | 10/1979 | Barabas et al. | 525/377 |

FOREIGN PATENT DOCUMENTS

| | | |
|---|---|---|
| 0234726 | 9/1987 | European Pat. Off. . |
| 300760 | 1/1989 | European Pat. Off. . |
| 503797 | 9/1992 | European Pat. Off. . |
| 524492 | 1/1993 | Fed. Rep. of Germany . |
| 2393818 | 5/1978 | France . |
| 910144 | 11/1962 | United Kingdom . |

OTHER PUBLICATIONS

*Patent Abstracts of Japan*, vol. 10, No. 230 (C-365) [2286], Aug. 9, 1986.

*Primary Examiner*—Bernard Lipman
*Attorney, Agent, or Firm*—Keil & Weinkauf

[57] ABSTRACT

A polymer comprising essentially at least two different repeat units of the formula I

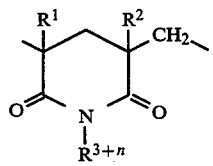

where
$R^1$ and $R^2$ are each hydrogen or methyl,
n is 0 or an integer from 1 to 9, and
$R^{3+n}$ are from two to ten mutually different groups selected from hydrogen, $C_1$–$C_{22}$-alkyl, $C_5$–$C_8$-cycloalkyl, $C_6$–$C_{10}$-aryl or $C_6$–$C_{10}$-aryl-$C_1$–$C_4$-alkyl, which radicals, except the $C_1$–$C_{22}$-alkyl, may each be monosubstituted, disubstituted or trisubstituted by radicals selected from the group consisting of $C_1$–$C_4$-alkyl, $C_1$–$C_4$-alkoxy and halogen, is obtainable by reacting a polymer based on $C_1$–$C_{20}$-alkyl esters of (meth)acrylic acid with ammonia and from one to nine primary amines or a mixture of from two to ten primary amines of the general formula II $$R^{3+n}NH_2 \qquad \text{II.}$$

2 Claims, No Drawings

POLY(METH)ACRYLIMIDES WITH DIFFERENT N-SUBSTITUTES

The present invention relates to a polymer comprising essentially at least two different repeat units of the formula I

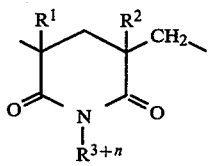

where
$R^1$ and $R^2$ are each hydrogen or methyl,
n is 0 or an integer from 1 to 9, and
$R^{3+n}$ are from two to ten mutually different groups selected from hydrogen, $C_1$-$C_{22}$-alkyl, $C_5$-$C_8$-cycloalkyl, $C_6$-$C_{10}$-aryl or $C_6$-$C_{10}$-aryl-$C_1$-$C_4$-alkyl, which radicals, except the $C_1$-$C_{22}$-alkyl, may each be monosubstituted, disubstituted or trisubstituted by radicals selected from the group consisting of $C_1$-$C_4$-alkyl, $C_1$-$C_4$-alkoxy and halogen,
obtainable by reacting a polymer based on $C_1$-$C_{20}$-alkyl esters of (meth)acrylic acid/with ammonia and from one to nine primary amines or a mixture of from two to ten primary amines of the general formula II $$R^{3+n}NH_2 \qquad \qquad II$$

The present invention further relates to a process for preparing these polymers, to their use for preparing shaped articles and to shaped articles from these polymers.

To enhance the heat distortion resistance of acrylate molding materials, in particular of polymethyl methacrylate (PMMA), they can be reacted in a polymeranalogous reaction with primary amines to form cyclic imide structures. The reaction can be carried out both in the melt and in solution. For instance, U.S. Pat. No. 2,146,209 describes the preparation of imide-containing polymers by reacting PMMA with ammonia, urea and derivatives thereof and aliphatic amines.

To reduce the yellowness and to improve the transparence of the products of U.S. Pat. No. 2,146,209, EP-B-234,726 proposes carrying out the imidization in a solvent mixture consisting of an aromatic hydrocarbon and an aliphatic alcohol.

A solvent-free imidization in an extruder is described in U.S. Pat. No. 4,246,374.

The prior art poly(meth)acrylimides all have very good values in transparence and weathering stability but are unsatisfactory in heat distortion resistance and stress cracking resistance.

It is an object of the present invention to provide poly(meth)acrylimides which are free of the abovementioned disadvantages.

We have found that this object is achieved by the polymers defined at the beginning.

We have also found a process for preparing these polymers, a use for them in preparing shaped articles, and shaped articles that are obtainable from these polymers.

For the purposes of the present invention, polymers based on $C_1$-$C_{20}$-alkyl esters of (meth)acrylic acid include both homopolymers and copolymers, which copolymers may additionally contain other ethylenically unsaturated comonomers.

The preferred $C_1$-$C_{20}$-alkyl methacrylates are the $C_1$-$C_4$-alkyl esters such as methyl methacrylate (MMA), ethyl methacrylate, propyl methacrylate, n-butyl methacrylate, isobutyl methacrylate and tert-butyl methacrylate, of which methyl methacrylate is particularly preferred, and also mixtures thereof.

Preferred $C_1$-$C_{20}$-alkyl acrylates are the $C_1$-$C_4$-alkyl esters such as methyl acrylate (MA), ethyl acrylate, propyl acrylate, n-butyl acrylate, isobutyl acrylate and tert-butyl acrylate, of which methyl acrylate is particularly preferred, and also mixtures thereof.

Suitable ethylenically unsaturated comonomers are acrylic acid, methacrylic acid, maleic acid derivatives such as imides and $C_1$-$C_{10}$-alkyl esters, iraconic acid derivatives such as imides and $C_1$-$C_{10}$-alkyl esters, acrylonitrile, methacrylonitrile, styrshe, α-methylstyrene, ethylene, propylene, butadiene and also mixtures thereof.

The polymers can be prepared in a single or multiple stage process, although in the case of a multiple stage polymerization at least the outer stage must contain groups that can be imitated.

In general, the polymers comprise more than 50, preferably more than 80, % by weight of $C_1$-$C_{20}$-alkyl esters of mathacrylic acid and acrylic acid. Of particular advantage from observations to date are polymers comprising from 80 to 100% by weight of methyl methacrylate and from 0 to 20 % by weight of methyl acrylate within a weight average molecular weight range ($\overline{M}_w$) of from 20,000 to 300,000 g/mol.

Suitable imidizing reagents besides ammonia are primary amines, $R^{3+n}NH_2$, selected from the group consisting of $C_1$-$C_{22}$-alkylamine, $C_5$-$C_8$-cycloalkylamine, $C_6$-$C_{10}$-aryl-amine, $C_6$-$C_{10}$-aryl-$C_1$-$C_4$-alkylamine, wherein the cycloalkyl, aryl and aralkyl moieties may each be monosubstituted, disubstituted or trisubstituted by radicals selected from the group consisting of $C_1$-$C_4$-alkyl, $C_1$-$C_4$-alkoxy and halogen such as fluorine, chlorine or bromine.

Examples are methylamine, ethylamine, n-propylamine, i-propylamine, n-butylamine, 1-methylpropylaanine, 2-methylpropylamine, 1,1-dixaethylethylamine, n-pentylamine, 1-methylbutylamine, 2-methylbutylamine, 3-methylbutylamine, 2-dimethylpropylamine, 1-ethylpropylamine, n-hexylamine, n-heptylamine, n-octylamine, n-nonylamine, n-decylamine, n-undecylamine, n-dodecylamine, stearylamine, cyclopentylamine, cycloheptylamine, cyclooctylamine, cyclohexylamine, aniline, 2-, 3-, 4-methylaniline, 2-, 3-, 4-methoxyaniline, 2-, 3-, 4-chloroaniline, 2-, 3-, 4-bromoaniline, benzylamine, phenethylamine and phenyl-propylamine, particularly preferably cyclohexylamine.

The present invention utilizes at least two primary amines or ammonia with at least one primary amine, making customized poly(meth)acrylimides available.

For example, the flowability can be improved by imidizing with a mixture of a long-chain amine, $R^3NH_2$, where $R^3=C_{12}$-$C_{18}$-alkyl, for good flow behavior, and a short-chain or cyclic amine, $R^4NH_2$, where $R^4=C_1$-$C_4$-alkyl or $C_5$-$C_8$-cycloalkyl, to maintain good heat distortion resistance.

Furthermore, the refractive index of a poly(meth)acryliamide can be raised while retaining good weathering stability by using a mixture of an aromatic amine, $R^3=$aryl such as phenyl, for raising the refractive index and a short-chain alkylamine, $R^4=C_1-C_4$-alkyl such as methyl, ethyl, n-propyl, isopropyl, n-butyl, isobutyl, sec-butyl, tert-butyl, or a cycloalkylamine, $R^4=C_5-C_8$-cycloalkyl such as cyclopentyl, cyclohexyl, cycloheptyl, cyclooctyl, for maintaining good weathering stability.

It is also possible to control the compatibility of blends of different polymers with poly(meth)acrylimide through the choice of substituent on the nitrogen atom of the imide ring. For instance, compatibilizers for aromatic blend components such as polycarbonate, polystyrene, polyether sulfones or polyether ketones are obtainable when $R^3$ is aryl such as substituted or unsubstituted phenyl. For polar (graft-linking) blend components such as polyamides it is preferable for $R^3$ to be hydrogen. In either of these two cases the second component $R^4$ is preferably a short-chain $C_1-C_4$-alkyl radical or a $C_5-C_8$-cycloalkyl radical in order to maintain the high heat distortion resistance and good weathering stability.

Of course, for further optimization it can also be sensible to introduce besides $R^3$ and $R^4$ further N-substituents ($R^5$ to $R^{12}$) in the form of further amines $R^5NH_2$ to $R^{12}NH_2$.

The reaction is in general carried out by heating a mixture consisting of acrylate polymer, the amines or ammonia and the amine(s) in a solvent or solvent mixture in the absence of oxygen. Starting materials which are gaseous under normal conditions, such as ammonia and methylamine, are introduced into the reaction vessel in a conventional manner under pressure or condensed.

The amines and the ammonia can be present right from the start of the reaction as part of the initial charge or can be added for example continuously at the rate of their consumption.

The reaction can be carried out not only continuously but also batchwise.

The weight ratio of amine and ammonia to acrylate polymer is in general within the range from 1:1 to 400:1, preferably from 1:1 to 200:1.

The solvent used can be basically any substance in which not only the polymeric starting material but also the poly(meth)acrylimide of the invention are soluble. Examples are aromatic solvents such as benzene, toluene, xylene alcohols such as methanol, ethanol, n-propanol, isopropanol, diethylene glycol aprotic, polar solvents such as N,N'-disubstituted cyclic or acyclic carboxamides such as dimethylformamide, diethylformamide, dimethylacerawhide or diethylacetamide N-methyl-2-pyrrolidone, N-ethyl-2-pyrrolidone N,N,N',N'-tetrasubstituted cyclic or acyclic ureas such as tetramethylurea N-substituted cyclic or acyclic (poly)amines such as dicyclohexylmethylamine, dimethylcyclohexylamine, N,N,N',N'-tetraanethylethylenediamine or N,N,N',N'-tetramethylhexamethylenediamine ethers such as ethylene glycol dimethyl ether and diethylene glycol dimethyl ether alkylene carbonates such as ethylene carbonate and propylene carbonate and other customary aprotic and polar solvents such as nitroalkanes such as nitromethane, dimethyl sulfoxide, diphenyl sulfoxide and sulfolane, of which N-methylpyrrolidone is preferred, and mixtures thereof, preferably a mixture of toluene and methanol.

The weight ratio of solvent (mixture) used to polymer is in general within the range from 1:1 to 100:1, preferably from 1:1 to 10:1.

The reaction can be carried out not only with but also without solvent, the imidization on an extruder being advantageously carried out without solvent.

The reaction temperature is in general within the range from 100° to 350° C., preferably within the range from to 270° C.

The reaction pressure is in general uncritical. The reaction is in general carried out within the range from 80 to 250 kPa, preferably under atmospheric pressure.

The choice of pH range is likewise uncritical and because of the amine used is in general above 7.

The reaction time is in general within the range from 0.01 to 100 h, preferably from 0.05 to 20 h.

Furthermore, the reaction may be speeded up with catalysts in amounts within the range from 0.01 to 10% by weight, based on the polymer used. Examples are tertiary amines such as tricyclohexylamine substituted guanidines such as 1,1,3,3-tetramethylguanidine and 1,3-diphenylguanidine tetrasubstituted alkylammonium compounds such as trimethylstearylammonium chloride organic titanium compounds such as tetrapropoxytitanium and tetrabutoxytitanium organic tin compounds such as dibutyltin oxide and dibutyltin didodecanoate aromatic amines and imides such as quinoline, isoquinoline, 4-benzylpyridine, 4-phenylpyridine, 2-hydroxypyridine, 1,3-, 1,4- and 2,3-benzodiazine and 2,2'-, 2,3'- and 2,4'-bipyridyl imides such as N,N'-dicyclohexylcarbodiimide and also antimony trioxide, tin dioxide, sodium amide, sodium and potassium alkoxides such as sodium methoxide and potassium methoxide, ammonium chloride and ammonium iodide.

The poly(meth)acrylimide of the invention can be processed in a conventional manner, for example by injection molding, extrusion or sintering, to prepare shaped articles.

The poly(meth)acrylianides of the invention are advantageous over PMMA or mixtures of two different "homo"-poly(meth)acrylimides in combining heat distortion resistance and stress cracking resistance with transparence and weathering stability.

In contradistinction to prior art poly(meth)acryliamides, the poly(meth)acryliamides of the invention possess enhanced flowability.

EXAMPLES

Example 1

In a pressure autoclave, a solution of 200g of PMMA (comprising 99% by weight of MMA and 1% by weight of MA and having an average molecular weight ($\overline{M}_w$) of 115,000 g/mol) in a solvent mixture consisting of 540g of toluene and 60g of methanol was admixed with 1.5 mol of methylamine and 0.5 mol of ammonia, the two nitrogen compounds being introduced into the autoclave by condensation. The autoclave was then heated to 230° C. After 8 h the contents were cooled and the polymer formed was precipitated in 1200 ml of methanol and dried at 50° C. (and 10 kPa).

The results of the quality control tests are revealed in Table 1.

Examples 2 TO 8

By the procedure of Example 1 200g of PMMA of the same composition as in Example 1 were reacted in each case with 2 mol of a mixture of a/nines or of an amine with ammonia at 230° C. in 600g of the solvent mixture used in Example 1 over 8 h and worked up as described above.

The results of the quality control tests are revealed in the table.

The glass transition temperature $T_g$ of the polymers was determined by the DSC method (ASTM D 3418–82) on a DSC-30 instrument from Mettler.

TABLE

IMIDIZATION EXPERIMENTS

| Ex. No. | $R^3$-$NH_2$ (mol %) $R^3$ | $R^4NH_2$ (mol %) $R^4$ | N content[1] [%] | Theoretical[2] imide content [%] | $T_g$ [°C.] |
|---|---|---|---|---|---|
| 1 | $CH_3$ (75) | H (25) | 8.4 | 97 | 199 |
| 2 | $CH_3$ (25) | H (75) | 8.3 | 93 | 208 |
| 3 | $CH_3$ (25) | C—$C_6H_{11}$ (75) | 6.0 | 94 | 185 |
| 4 | $CH_3$ (75) | C—$C_6H_{11}$ (25) | 7.4 | 97 | 188 |
| 5 | $CH_3$ (90) | $C_8H_{17}$ (10) | 7.2 | 91 | 171 |
| 6 | $C_6H_5$ (90) | $C_{10}H_7$ (10) | 5.1 | 85 | 216 |
| 7 | $C_6H_5$ (25) | C—$C_6H_{11}$ (75) | 5.8 | 96 | 201 |
| 8 | $CH_3$ (25)/c-$C_6H_{11}$ (70)/ $C_{18}H_{37}$ (5) | | 5.8 | 93 | 179 |

[1] nitrogen content from elemental analysis
[2] theoretical imide content calculated as
$$\frac{X \% \text{ of N (from elemental analysis)}}{Y \% \text{ of N (theoretical maximum value)}} \times 100\%$$

We claim:

1. A polymer comprising essentially at least two different repeat units of the formula I

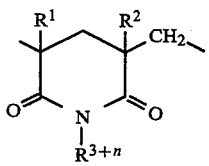

where
$R^1$ and $R^2$ are each hydrogen or methyl,
n is 0 or an integer from 1 to 9, and
$R^{3+n}$ are from mutually different groups selected from hydrogen and $C_1$–$C_4$ alkyl,
obtained by reacting a polymer based on $C_1$–$C_{20}$-alkyl esters of (meth)acrylic acid with ammonia and primary amines of the formula II $$R^{3+n}NH_2 \qquad \text{II.}$$

2. A process for preparing a polymer as claimed in claim 1, which comprises reacting a polymer based on $C_1$–$C_{20}$-alkyl esters of (meth)acrylic acid with ammonia and primary amines of the formula II $$R^{3+n}NH_2 \qquad \text{II.}$$

* * * * *